United States Patent [19]

Lambert et al.

[11] Patent Number: 4,517,356
[45] Date of Patent: May 14, 1985

[54] PROCESS FOR POLYMERIZING THERMOSETTING RESINS

[76] Inventors: François Lambert, 85 Rue de la Convention, 75015 Paris; Christian Val, 81 Rue de Paris, 78470 St Remy lès Chevreuse, both of France

[21] Appl. No.: 539,914

[22] Filed: Oct. 7, 1983

[30] Foreign Application Priority Data

Oct. 8, 1982 [FR] France .................................. 82 17180

[51] Int. Cl.³ .......................... C08F 6/00; B29C 25/00
[52] U.S. Cl. ..................................... 528/483; 264/236; 264/347; 528/491; 528/500
[58] Field of Search ................. 528/483, 491, 500, 87, 528/503; 264/236, 347

[56] References Cited

U.S. PATENT DOCUMENTS

| | | | |
|---|---|---|---|
| 661,177 | 11/1900 | Hill | 264/347 |
| 3,122,445 | 2/1964 | Osborn | 528/483 |
| 3,177,193 | 4/1965 | Scott | 528/483 |
| 3,423,377 | 1/1969 | Tennenhouse | 528/483 |
| 3,545,911 | 12/1970 | Papero et al. | 528/483 |
| 3,718,630 | 2/1973 | Leverette | 528/483 |
| 4,424,340 | 1/1984 | Goldstein et al. | 528/500 |

OTHER PUBLICATIONS

EPO-TEK H 20 E, Data Sheet of Épotecny (Vélizy) France, undated.

Primary Examiner—Herbert S. Cockeram
Attorney, Agent, or Firm—Karl F. Ross; Herbert Dubno

[57] ABSTRACT

A method of polymerizing a thermosetting resin such as an epoxy resin charged with silver particles in which shaped bodies of the resin are brought cold into contact with vapor of an organic liquid boiling at a temperature of above 100° C. so that a condensate from this liquid forms on the bodies in temperature equilibrium so that the heat of vaporization is transferred upon such condensation rapidly to the bodies and the latter are polymerized rapidly under the constant temperature and pressure conditions.

3 Claims, 1 Drawing Figure

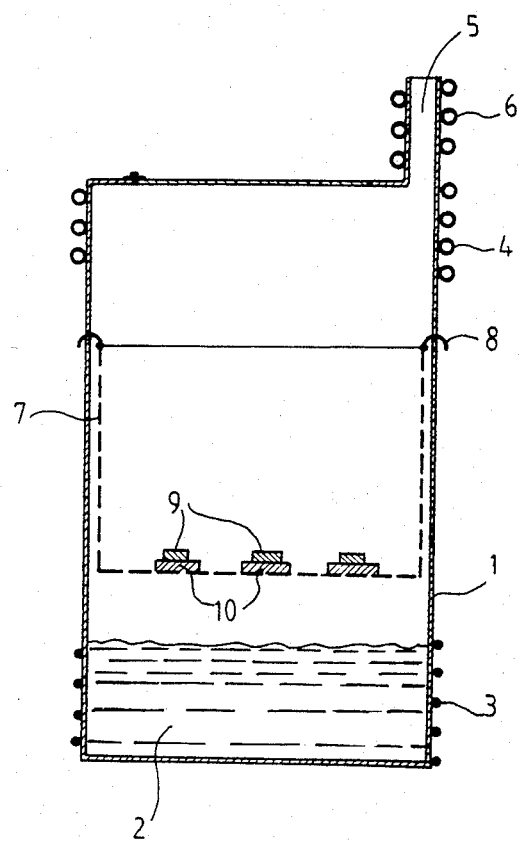

PROCESS FOR POLYMERIZING THERMOSETTING RESINS

FIELD OF THE INVENTION

The present invention relates to a process for polymerization of thermosetting resins.

BACKGROUND OF THE INVENTION

Polymerization of thermosetting resins requires a supply of heat. This has heretofore been provided by conduction, for example on a heating plate, by radiation, for example in an infrared tunnel, or by convection, for example in a stream of hot air. These heating means may also be used in combination; for example a conventional process for polymerizing a piece of thermosetting resin is to place it in an oven, in which case the piece is heated both by conduction, radiation and by convection.

OBJECT OF THE INVENTION

It is an object of the present invention to provide a process for polymerization of a piece of thermosetting resin which, among other advantages, surprizingly makes it possible to obtain a better polymerization for a given polymerization temperature.

SUMMARY OF THE INVENTION

The process according to the invention is characterized in that the cold piece to be polymerized is placed in the vapor phase of a boiling liquid. A condensation of liquid is then produced on the piece which very rapidly takes said piece to the boiling temperature of the liquid.

As the boiling temperature is constant for a given pressure, the temperature to which the piece is taken cannot exceed the boiling temperature and overheating of the piece is impossible. The heat of vaporization of a liquid being considerable with respect to the specific heat of the corresponding gas, the piece heats up very rapidly, in any case much more quickly than if the piece were simply placed in a volume containing a hot gas. If the boiling liquid has a high chemical inertia, it envelops the piece in the course of polymerization and protects it from the water vapor, the oxygen and atmospheric components. The surface of the piece is polymerized almost instantaneously and, thanks to the skin thus formed, the loss of weight is minimum. Finally, as has been indicated above, the degree of polymerization is particularly high, greater than that obtained by the conventional heating means.

The process is particularly applicable to the polymerization of pieces of epoxy resins, placed on an organic substrate, in which case it is possible, by choosing a suitable liquid, to effect polymerization of the piece at a temperature clearly higher than 100° C., for example at 150° C., polymerization then occurring extremely rapidly.

The process according to the invention may be carried out on batches of pieces to be polymerized or continuously.

It is known to use water vapor to polymerize a plastics material. However, in this case, the calories are furnished to the plastics material by the vapor which is superheated and whose temperature is variable. This mode of heating is totally different from the process according to the invention in which the vapor is in the presence of its boiling liquid phase, therefore at boiling temperature and in which the calories are furnished by the condensation of the water vapor on the piece to be polymerized.

BRIEF DESCRIPTION OF THE DRAWING

The invention will be more readily understood on reading the following description with reference to the accompanying drawing, in which:

The single FIGURE shows a diagram of a device for carrying out the process according to the invention.

SPECIFIC DESCRIPTION

Referring now to the drawing, the FIGURE shows a receptacle 1 of which the lower part contains a liquid 2 and is surrounded by a heating element 3. Its upper part is surrounded by a tube 4 through which a stream of cold water may circulate and which forms condenser; it communicates with the outside by a conduit 5 likewise surrounded by a cooling tube 6.

Inside the receptacle 1 is disposed a stainless steel basket 7 which is suspended from the wall of the recipient by hooks 8 and in which the pieces to be polymerized are placed.

When the liquid 2 is taken to boiling point, the temperature inside the recipient 1 is equal to that of the boiling point of the liquid 2. If a cold piece is placed in basket 7, this piece is then virtually instantaneously to this temperature and polymerizes rapidly.

The pieces to be polymerized may for example be constituted by elements 9 made of an epoxy resin charged with silver, such as the one known under the commercial name of "EPOTEK H 20 E", which are placed on a substrate 10 which may for example be of alumina, glass or polyester resin.

The epoxy resins having to be polymerized at a temperature greater than 100° C., for example 150° C., the liquid 2 must have a boiling point higher than 100° C. This liquid may to this end be constituted by an fluorocarbons such as the one known commercially under the name of FC 75 or FC 43 of which the boiling points are 102° C. and 174° C. respectively; by mixing them in suitable proportions, it is possible to obtain a liquid having any desired boiling point between 102° C. and 174° C.

The resistivity of an epoxy resin charged with silver is a function of the rate of polymerization of the resin; it is lower as polymerization is better. The rate of polymerization of a piece may therefore be determined by measuring its resistivity.

Comparative tests have been carried out on elements 9 of which certain have been polymerized in an oven while the others were polymerized in vapor phase according to the invention, the rate of polymerization being determined each time by measuring the resistivity given in microohm/cm. The results are given in the following Table:

TABLE 1

| Temperature | Mode of Heating | Duration in minutes | Nature of substrate 10 | Resistivity |
|---|---|---|---|---|
| 102° | Oven | 25 | Alumina | 542 |
| 102° | Vapor phase | " | " | 541 |
| 102° | Oven | " | Glass | 691 |
| 102° | Vapor phase | " | " | 651 |
| 102° | Oven | " | Polyester | 902 |
| 102° | Vapor phase | " | " | 590 |
| 102° | Oven | 30 | Alumina | 655 |
| 102° | Vapor phase | " | " | 280 |
| 102° | Oven | " | Glass | 710 |

TABLE 1-continued

| Temperature | Mode of Heating | Duration in minutes | Nature of substrate 10 | Resistivity |
|---|---|---|---|---|
| 102° | Vapor phase | " | " | 648 |
| 102° | Oven | " | Polyester | 1000 |
| 102° | Vapor phase | " | " | 421 |
| 120° | Oven | 15 | Alumina | 516 |
| 120° | Vapor phase | " | " | 358 |
| 120° | Oven | " | Glass | 531 |
| 120° | Vapor phase | " | " | 354 |
| 120° | Oven | " | Polyester | 750 |
| 120° | Vapor phase | " | " | 429 |
| 150° | Oven | 4 | " | 808 |
| 150° | Vapor phase | " | " | 413 |
| 150° | Oven | 5 | Alumina | 769 |
| 150° | Vapor phase | " | " | 309 |
| 150° | Oven | " | Glass | 560 |
| 150° | Vapor phase | " | " | 505 |
| 150° | Oven | " | Polyester | 608 |
| 150° | Vapor phase | " | " | 326 |
| 175° | Oven | 0.5 | Alumina | non-polymerized |
| 175° | Vapor phase | " | " | 818 |
| 175° | Oven | " | Glass | non-polymerized |
| 175° | Vapor phase | " | " | 453 |
| 175° | Oven | " | Polyester | non-polymerized |
| 175° | Vapor phase | " | " | 845 |
| 175° | Oven | 0.75 | Alumina | non-polymerized |
| 175° | Vapor phase | " | " | 285 |
| 175° | Oven | " | Glass | non-polymerized |
| 175° | Vapor phase | " | " | 603 |
| 175° | Oven | " | Polyester | 1034 |
| 175° | Vapor phase | " | " | 244 |

This Table shows that, for the same temperature, the rate of polymerization is clearly higher, at a given temperature, with the process according to the invention. Moreover, it is possible to polymerize the resin under conditions which do not bring about polymerization in an oven; a piece may for example be polymerized in thirty seconds, which is impossible in an oven.

Relative weight losses of the resin 9 in the course of polymerization have also been determined and the results are given in the following Table:

TABLE 2

| Temperature | Mode of heating | Duration in minutes | Nature of substrate 10 | $\frac{DW}{W} \times 10^3$ |
|---|---|---|---|---|
| 120° | Oven | 15 | Glass | 86 |
| 120° | Vapor phase | " | " | 55 |
| 120° | Oven | " | Polyester | 80 |
| 120° | Vapor phase | " | " | 66 |
| 150° | Oven | 5 | alumina | 64 |
| 150° | Vapor phase | " | " | 54 |
| 150° | Oven | 5 | Glass | 64 |
| 150° | Vapor phase | " | " | 52 |
| 150° | Oven | " | Polyester | 68 |
| 150° | Vapor phase | " | " | 49 |
| 175° | Oven | 0.75 | " | 65 |
| 175° | Vapor phase | " | " | 53 |

This Table shows that the weight losses of the resin are clearly less with the process according to the invention.

Tests have also shown that the temperature of vitreous transition was unexpectedly increased. While in the case of polymerization in an oven this transition temperature could never exceed 100° C., this temperature attains a value of 130° C. upon heating in vapor phase for five minutes to 150° C. or for forty five seconds to a temperature of 175° C. As the temperature of vitreous transition is the best means for controlling polymerization, these results show that heating in vapor phase is a means for baking the epoxy resins which unexpectedly gives extraordinarily good results.

It goes without saying that the present invention is not to be considered as being limited to the embodiment described and shown, but covers, on the contrary, all the variants thereof.

We claim:

1. A process for the polymerization of a thermosetting resin which comprises the steps of:
    placing a cold shaped body of thermosetting resin to be polymerized, in the vapor phase of an organic boiling liquid, to obtain polymerization of said resin at a temperature of more than 100° C. wherein the temperature and pressure are held constant at the boiling point of said liquid and heat is transferred to said body of condensation of said liquid at said temperature directly on said body; and
    recovering the shaped body of polymerized thermosetting resin.

2. The process defined in claim 1 wherein the temperature of the boiling liquid is 102° to 174° C.

3. The process defined in claim 1 wherein the thermosetting resin to be polymerized is an epoxy resin charged with silver.

* * * * *